United States Patent [19]
Wood, III

[11] Patent Number: 5,261,147
[45] Date of Patent: Nov. 16, 1993

[54] INDEXING SYSTEM
[75] Inventor: David B. Wood, III, Maineville, Ohio
[73] Assignee: Cincinnati Milacron Inc., Cincinnati, Ohio
[21] Appl. No.: 32,124
[22] Filed: Mar. 17, 1993
[51] Int. Cl.$^5$ .............................................. B23Q 5/26
[52] U.S. Cl. .................................... 29/33 P; 29/563; 74/816; 74/826; 198/346.1
[58] Field of Search ...................... 29/33 P, 563, 38 C; 198/346.1, 345.3, 346.2; 74/813 R, 816, 818, 822, 826

[56] References Cited
U.S. PATENT DOCUMENTS

| | | | |
|---|---|---|---|
| 3,593,597 | 7/1971 | Jennings ................................ | 74/818 |
| 3,698,435 | 10/1972 | Evans . | |
| 3,825,245 | 7/1974 | Osburn et al. .................. | 29/33 P X |
| 4,356,904 | 11/1982 | Siarto .................................. | 198/345.1 |
| 4,373,406 | 2/1983 | Piotrowski .......................... | 198/346.1 |
| 4,498,571 | 2/1985 | Nomura et al. .................. | 29/33 P X |
| 4,637,108 | 1/1987 | Murata et al. ........................ | 29/33 P |
| 4,797,052 | 1/1989 | Ohta et al. ............................ | 29/33 P |
| 4,797,989 | 1/1989 | Cherko ............................ | 198/346.1 |
| 4,807,338 | 2/1989 | Myles .................................. | 29/38 C |
| 5,099,980 | 3/1992 | Babel ................................ | 198/346.1 |

OTHER PUBLICATIONS

Machine Hydraulics by Albert H. Dall, pp. 23-24.
Fluid Power Theory and Applications, by James A. Sullivan, pp. 180-183.
Hydraulic and Pneumatic Power for Production by Harry L. Stewart, pp. 626-627.
Electrohydraulic Servo Systems, by James E. Johnson, pp. 40-41.
Standard Industrial Hydraulics Questions and Answers, by Stephen Michael Elonka, pp. 200-205.
Cincinnati Milacron Brochure, "Maxim 500 and 630 Around the Globe, You Won't Find a More Innovative Line of Horizontal CNC Machining Centers", Publication No. M-5295.

Primary Examiner—William A. Briggs
Attorney, Agent, or Firm—Frost & Jacobs

[57] ABSTRACT

An indexing system for the rotary work changer of a machining center for supporting and interchanging work-holder pallets between the machining zone and the load/unload zone of the machining center. The indexing system comprises a hydraulically powered rotary actuator attached to the work changer and having first and second ports, a hydraulic fluid pressure line and a hydraulic fluid return line, a directional valve for connecting the hydraulic fluid pressure line to either one of the first and second ports of the actuator depending on the desired direction of rotation of the work changer, and for connecting the other of the actuator first and second ports to the hydraulic fluid return line, a control valve connected between the actuator first and second ports and the directional valve to regulate the flow of return fluid from the actuator so as to cause the work changer to accelerate, reach a maximum speed and then decelerate to a slow speed just before reaching the desired one of its first and second positions.

15 Claims, 7 Drawing Sheets

INDEXING SYSTEM

TECHNICAL FIELD

The invention relates to an indexing system for the rotary work changer of a machining center, and more particularly to such an indexing system characterized by hydromechanical velocity control with position feedback.

BACKGROUND ART

The indexing system of the present invention may have application to many types of devices rotatable between two predetermined rotative positions. The indexing system is particularly well adapted for the control and actuation of the rotary work piece changer of a machining center. For purposes of an exemplary showing, the indexing system of the present invention will be described in terms of this application.

In a typical machining center, the work pieces to be machined are supported on work-holder pallets. The machining center has a work or machining zone and a load/unload zone. Upon completion of a machining operation, it is necessary to move the machined work piece from the machining zone to the load/unload zone, while at the same time moving an unmachined work piece from the load/unload zone to the machining zone. To accomplish this interchange, it is common practice to provide a rotary work changer for supporting and interchanging the work-holder pallets between the machining zone and the load/unload zone. It is desireable that the interchange be made as fast as possible and that the rotary work changer be characterized by uniform performance under different load conditions.

To accomplish this, the present invention teaches an indexing system which comprises a hydraulically powered actuator operatively connected to the rotary work changer of the machining center. The rotary actuator has first and second ports, either one of which may be connected to a hydraulic fluid pressure line, the other being connected to a hydraulic fluid return line, depending upon whether the rotary work changer is to be rotated in a clockwise or counterclockwise direction. A directional valve is provided to determine which of the first and second ports of the actuator is to be connected to the hydraulic pressure line, and which is to be connected to the hydraulic fluid return line. A control valve is interposed between the hydraulic actuator ports and the directional valve and controls the rate of rotation of the rotary work changer in direct response to the rotative position of the rotary work changer, all as will be described hereinafter. It has been found that the indexing system of the present invention is substantially insensitive to mass and temperature. The indexing system of the present invention can be built and tested as a separate unit and then mounted on the machine center.

DISCLOSURE OF THE INVENTION

According to the invention there is provided an indexing system for the rotary work changer of a machining center. The work changer serves to support and interchange work-holder pallets between the machining zone and the load/unload zone of the machining center. The indexing system comprises a rotary output member operatively connected to the rotary work changer. A hydraulic actuator rotates the rotary output member in clockwise and counterclockwise directions. The hydraulic actuator has first and second ports.

A hydraulic fluid pressure line and a hydraulic fluid return line are provided. A directional valve is used to connect the hydraulic fluid pressure line to either one of the first and second ports of the hydraulic actuator, depending upon the desired direction of rotation thereof, and to connect the hydraulic fluid return line to the other of the first and second ports of the hydraulic actuator.

A control valve is interposed between the hydraulic actuator and the directional valve. The control valve has a cylindrical bore and a spool axially shiftable therein. The spool has a land adjacent each of its ends, with an intermediate land located therebetween. These lands divide the bore into first and second chambers. The first chamber has a first variable flow metering port and a first fixed flow metering port. The second chamber similarly has a second variable flow metering port and a second fixed flow metering port. The connections between the hydraulic actuator, the control valve and the directional valve are such that the directional valve can connect the hydraulic pressure line directly to the first port of the hydraulic actuator. At the same time, it connects the second port of the hydraulic actuator to the return line through the second variable flow metering port and the second fixed flow metering port and the second chamber of the control valve. To reverse direction of rotation of the output member and the rotary work changer, the directional valve can be shifted to connect the hydraulic fluid pressure line directly to the second port of the hydraulic actuator, connecting the first port of the hydraulic actuator to the hydraulic fluid return line through the first variable flow metering port and the first fixed flow metering port of the first chamber of the control valve.

The spool of the control valve is axially shiftable in one direction to close off the first variable flow metering port of the first chamber, and is axially shiftable in the opposite direction to close off the second variable flow metering port of the second chamber. The control valve spool is shifted axially by a cam surface on the rotary output member. One end of the control valve spool is constantly urged against the cam surface. As a consequence of this arrangement, the axial position of the control valve is governed by the rotative position of the rotary output member and the work changer attached thereto. As a result of this position feedback arrangement, when the rotary work changer rotates through an interchange move, it will first accelerate to a maximum speed in an open loop manner. When the cam surface causes the control valve spool to begin to close the variable flow metering port (of that chamber of the control valve through which one of the hydraulic actuator ports is connected to the hydraulic fluid return line), a closed loop velocity control for deceleration is initiated. The rotary work changer is brought to its final desired position by flow through only the fixed metering port of the last mentioned chamber of the control valve.

DETAILED DESCRIPTION OF THE INVENTION

Figure 1:
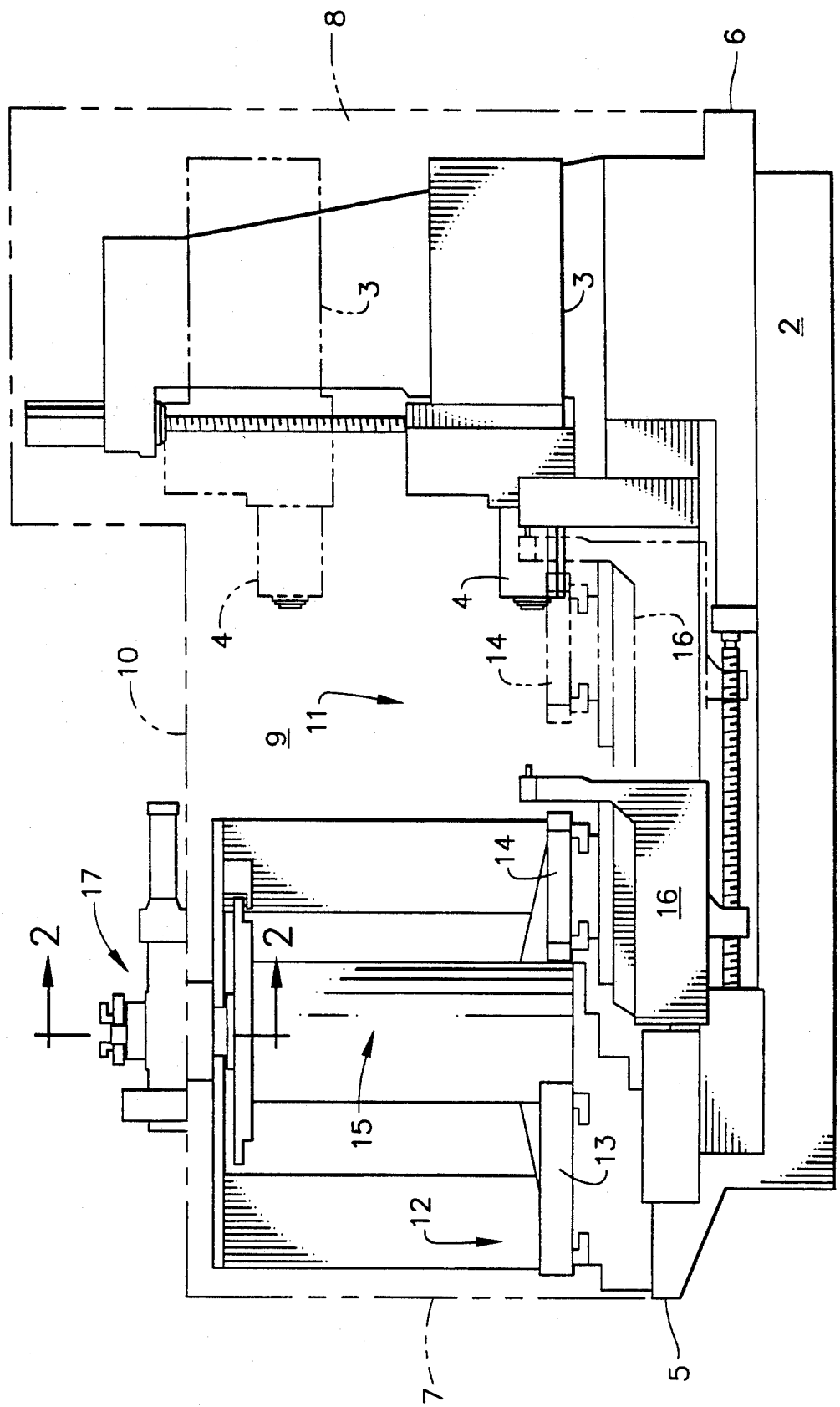
FIG. 1 is a simplified elevational view of a horizontal machining center provided with the indexing system of the present invention.

Reference is first made to FIG. 1 which constitutes a simplified representation of an exemplary machining center. Machining centers of this general type are manufactured, for example, under the designation MAXIM 500 and 630, by Cincinnati Milacron, Inc., of Cincinnati, Ohio.

The machining center is generally indicated at 1 and comprises a base 2 which supports a head assembly 3 provided with a spindle 4. The spindle 4 and head assembly 3 are shiftable vertically along a Y axis. The spindle 4 and head assembly 3 are shown in an uppermost position in broken lines in FIG. 1. The spindle 4 and head assembly 3 are also capable of being shifted transversely of the base 2 along an X axis.

FIG. 1 is a right side elevational view of the machining center 1, which has a forward end 5 and a rearward end 6. As is shown in broken lines, the machining center 1 is substantially fully enclosed by a front wall 7, a rear wall 8, a left side wall 9, a right side wall (not shown) and a roof 10.

The machining center 1 has a working or machining zone, generally indicated at 11, adjacent the spindle 4, and a load/unload zone, generally indicated at 12, adjacent its front wall 7. Typically, work pieces to be machined are mounted on work-holder pallets. Two such pallets are shown at 13 and 14 in FIG. 1. The pallets 13 and 14 are mountable on the support portion of a rotary work changer, generally indicated at 15.

It will be understood from FIG. 1 that the pallet 14, supporting a work piece to be machined (not shown), was loaded by the machine operator at the load/unload zone 12, and was rotated 180° by the rotary work changer 15 to the position illustrated in the machining zone 11. The pallet 14 may be engaged by a pallet receiver 16, capable of shifting the pallet 14 and its load along a Z axis, toward and away from the spindle 4. The pallet receiver 16 and the pallet 14 are shown adjacent the spindle 4 in broken lines.

While the work piece of pallet 14 is being subjected to a machining operation, the pallet 13 and its work piece (not shown) can be loaded onto the rotary work changer in the load/unload zone 12. When the machining operation is completed, the pallet receiver 16 will return the pallet 14 to the rotary work changer 15. Thereafter, the rotary work changer 15 will rotate through 180°, locating pallet 13 in the machining zone 11 and pallet 14 in the load/unload zone 12. While the work piece (not shown) of pallet 13 is being machined in the work zone 11, the pallet 14 and its work piece (not shown) may be removed from the rotary work changer 15 and a new pallet and work piece located in its place. As indicated above, it is desireable at the end of a machining operation to accomplish this interchange of pallets between the load/unload zone 12 and the machining zone 11 as fast as possible and that the rotary work changer be characterized by uniform performance under different load conditions.

The rotary work changer 15 is rotated and controlled by the indexing system of the present invention. The indexing system is mounted on the roof 10 of the enclosure of the machining center 1 and is generally indicated at 17 in FIG. 1.

Figure 4:
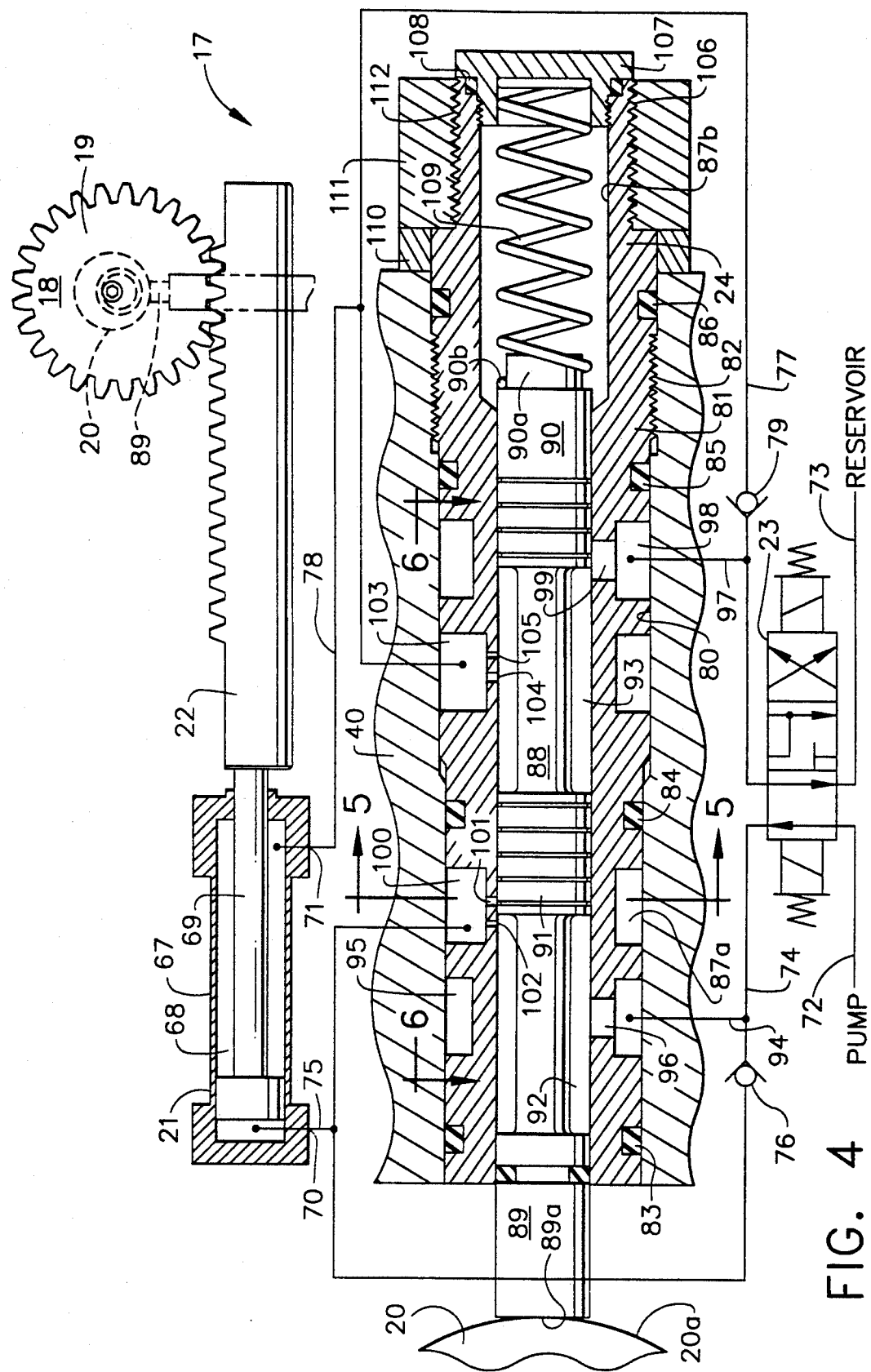
FIG. 4 is a diagramatic representation of the indexing system of the present invention.

Reference is next made to FIG. 4 wherein the basic elements of the indexing system are diagramatically illustrated. The indexing system 17 comprises a rotary output member 18 connected to the rotary workchanger 15 and having a pinion gear 19 and a cam 20. The rotary output member 18 is rotated in clockwise and counterclockwise directions by a hydraulic actuator 21 having a rack 22 engaging the teeth of pinion gear 19. The direction in which the rotary output member 18 turns is determined by a directional valve 23. Finally, the rate at which the rotary output member 18 and the rotary work changer 15 rotate is governed by a control valve 24. Each of these elements, comprising the indexing system 17, will now be described in its turn.

Figure 2:
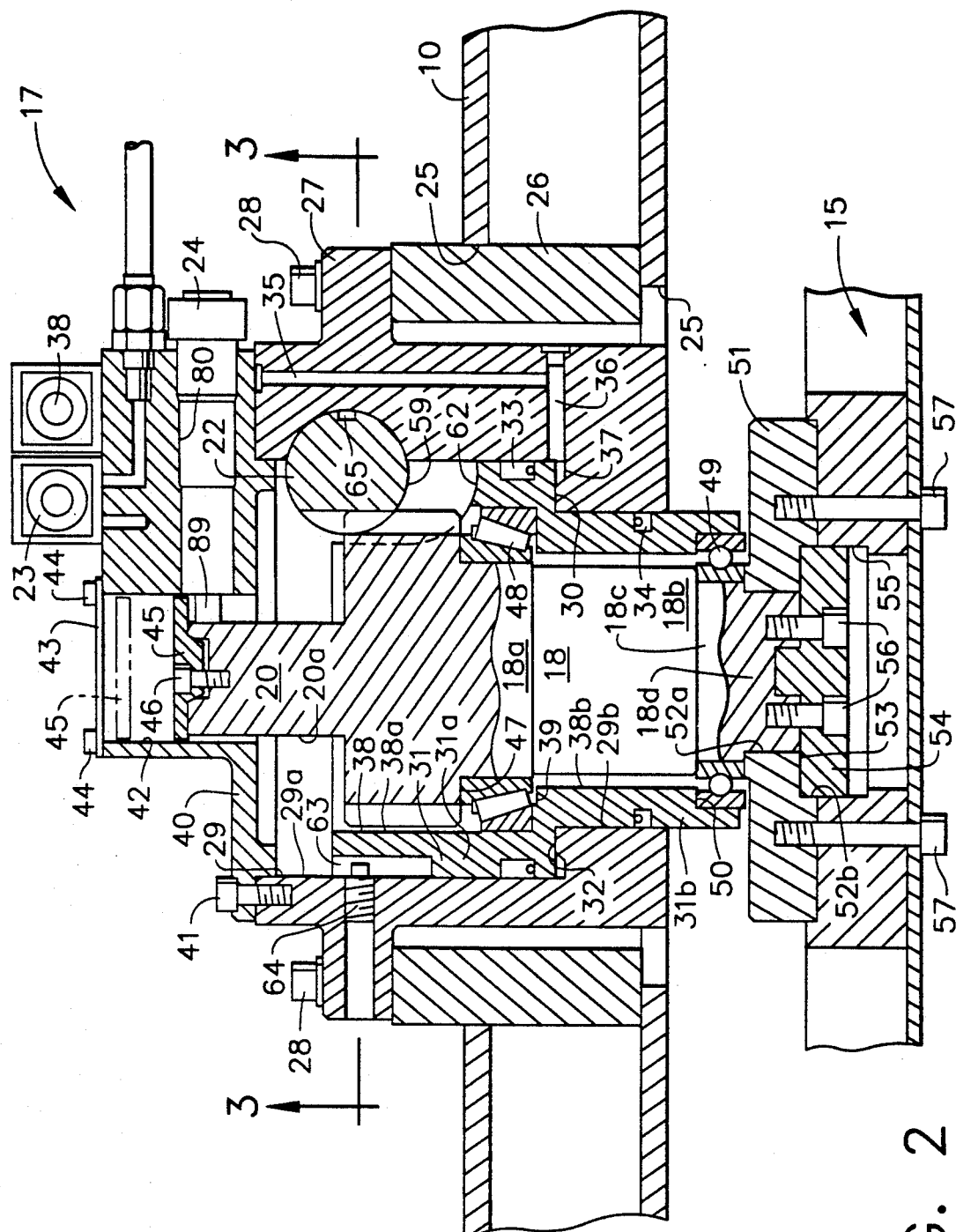
FIG. 2 is a fragmentary cross sectional view taken along section line 2—2 of FIG. 1.

Reference is made to FIG. 2 which fragmentarily illustrates the roof portion 10 of the enclosure of the machining center 1. The roof portion 10 has an opening 25 therethrough. A mount 26 is fixed in the opening 25. A peripheral flange portion of a housing 27 is supported by the mount 26 and is affixed thereto by a plurality of bolts, two of which are shown at 28 in FIG. 2.

The housing 27 has a vertical bore 29 therethrough. The bore 29 has an upper portion 29a and a lower portion 29b of lesser diameter, forming an annular shoulder 30 therebetween.

Mounted within bore 29 of housing 27 there is a piston 31. The piston 31 has an upper portion 31a which is just nicely received in the upper portion 29a of bore 29. The piston 31 has a lower portion 31b of a diameter just nicely received within the lower portion 29b of bore 29. Between the upper and lower portions 31a and 31b of piston 31 an annular shoulder 32 is formed which corresponds to the annular shoulder 30 of housing 27.

The upper portion 31a of piston 31 carries a seal 33 which sealingly engages the upper portion 29a of housing bore 29. Similarly, the lower portion 31b of piston 31 carries an annular seal 34 which sealingly engages the lower portion 29b of bore 29.

In FIG. 2, the piston 31 is shown in its lowermost position, wherein its annular shoulder 32 abuts the annular housing shoulder 30. The piston may be shifted upwardly within bore 29 by the introduction of hydraulic fluid through passages 35 and 36 to an annular groove 37 formed in the housing shoulder 30 and located beneath the annular shoulder 32 of the piston. When the hydraulic fluid under pressure lifting the piston 31 is connected to a reservoir (not shown) for the hydraulic fluid, the piston 31 will return to its lowermost position illustrated in FIG. 2. Control of the flow of hydraulic fluid to the piston 31 is accomplished by means of lift valve 38 shown in FIG. 2. The purpose of piston 31 will be apparent hereinafter.

The piston 31, itself, is hollow, having an axial bore 38 formed therein. The axial bore 38 has an upper portion 38a and a lower portion 38b of lesser diameter, forming an annular shoulder 39 therebetween.

Rotary output member 18 is rotatively mounted within the bore 38 of piston 31. While not a limitation of the present invention, it is preferred that the cam 20 and pinion gear 19 constitute integral, one-piece parts of the rotary output member 18. This construction is illustrated in FIG. 2. The cam 20 is cylindrical, having its vertical axis parallel to and offset from the vertical axis of the rotary output member 18. Cam 20 provides a simple cylindrical cam surface 20a. While other cam surface configurations can be used, a cylindrical cam surface is advantageous, since it is easy to manufacture as compared to a cam of complex peripheral shape.

The housing 27 is provided with a cover 40, affixed to the housing 27 by a plurality of bolts, one of which is shown at 41. The cover 40 has a bore 42 formed therein which is coaxial with the main portion of rotary output member 18. It will be noted that the upper end of cam 20 extends into the bore 42. The bore 42 is closed by a cap 43 affixed to the cover 40 by bolts 44. In similar fashion, the uppermost end of cam 20 is provided with a cap 45 affixed thereto by bolt 46.

The pinion gear portion 19 of the rotary output member 18 is located directly beneath the cam 20, as is clearly shown in FIG. 2. Immediately beneath the pinion gear portion 19, the rotary output member 18 has a portion 18a of smaller diameter, forming a shoulder 47. A roller bearing assembly 48 supports the rotary output member 18 within the cylinder 31, engaging the shoulder 47 and surrounding the rotary output member portion 18a. The roller bearing assembly 48 also abuts the piston 31 adjacent its shoulder 39.

The portion 18a of the rotary output member 18 is followed by a portion 18b of slightly lesser diameter. This, in turn, is followed by a portion 18c of yet smaller diameter. The portion 18c is surrounded by a ball bearing assembly 49 which also engages a shoulder 50 at the bottom end of piston portion 31b.

The portion 18c of rotary output member 18 is followed by a final portion 18d of slightly smaller diameter. A bearing retaining ring 51 is provided with a first central bore portion 52a and a second central bore portion 52b of greater diameter, forming an annular shoulder 53 therebetween. The lowermost portion 18d of rotary output member 18 extends into the bearing retaining ring bore portion 52a. A centering plate 54 is received within a bore 55 in the uppermost part of the rotary work changer 15 and within the bore portion 52b of the bearing retaining ring 51. The centering plate 54 is affixed to the portion 18d of rotary output member 18 by bolts, two of which are shown at 56. The uppermost part of the rotary work changer 15 is affixed to the bearing retainer ring 51 by bolts, two of which are shown at 57.

The arrangement just described is provided with means (not shown) by which the rotary output member 18 is keyed to the rotary work changer such that when rotation is imparted to the rotary output member 18, the rotary work changer 15 will turn with it.

The means for imparting rotation to the rotary output member and the rotary work changer will next be described. Reference is made to both FIGS. 2 and 3. The rotary output member 18 and the rotary work changer 15 are rotated by the rack 22 engaging the pinion gear 19 of the rotary output member 18. The rack 22 is located in an elongated bore 59 formed in the housing 27 and an extension 60 thereof. The free end of extension 60 is closed by a cap 61 held in place by bolts or the like (not shown). It will be apparent from FIG. 3 that as the rack 22 shifts downwardly as viewed in that Figure, pinion gear 19 will rotate in a clockwise direction as viewed in that Figure. Similarly, if the rack 22 is shifted upwardly as viewed in FIG. 3, the pinion gear 19, as viewed in that Figure, will be rotated in a counterclockwise direction.

Figure 3:
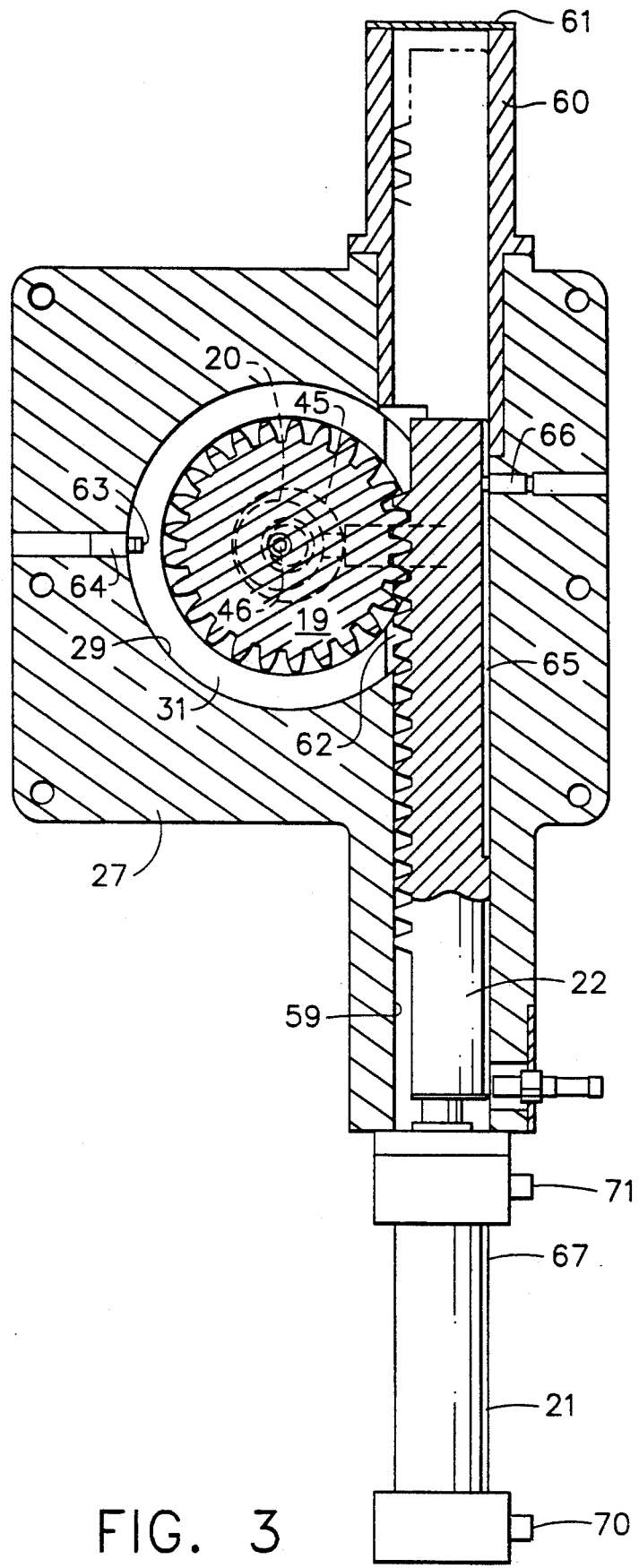
FIG. 3 is a cross sectional view taken along section line 3—3 of FIG. 2.

As is evident from both FIGS. 2 and 3, the bore 59 within which the rack 22 is mounted intersects the bore 29 of housing 27. To accommodate the rack 22 and the fact that the piston 31 is vertically shiftable (being shown in its lowermost position in FIG. 2), the upper portion 31a of the piston is relieved, as at 62. As will be evident from FIG. 2, the pinion gear 19 and the rack 22 have their teeth meshed, regardless of the vertical position of the rotary output member 18 and the piston 31. To assure that the relief 62 of the piston 31 is properly located with respect the rack 22, the outer surface of the piston 31 is provided with a vertical slot 63 into which a set screw 64 extends, precluding rotation of piston 31 about its axis. In a similar fashion, the rack 22 is provided with an elongated, longitudinally extending slot 65 into which a set screw 66 extends, assuring that the teeth of the rack are always properly oriented.

The rack 22 is shifted longitudinally by the hydraulic actuator 21. The hydraulic actuator 21 comprises a cylinder 67 containing a piston 68 provided with a piston rod 69 affixed to the rack 22. Shifting of the piston 68 (see FIG. 4) within cylinder 67 will cause corresponding shifting of the rack 22 and rotation of the rotary output member 18 and the rotary work changer 15. The cylinder 67 is provided with a first port 70 and second port 71. These ports will be further discussed hereinafter.

It will be understood by one skilled in the art that when the rotary work changer 15 is in either of its two diametrically opposed exchange positions, it will be supported by and locked in place by means (not shown) for this purpose, associated with the base 2. In order to rotate the rotary work changer 15, it is first necessary to lift the rotary work changer to release it from these support and locking means. This, of course, is the purpose of piston 31 and, as indicated above, is controlled by valve 38 (see FIG. 2). When an interchange rotation has been completed, the valve 38 will connect the groove 37 and passage 36 to the hydraulic fluid reservoir, causing the piston 31 to lower, resulting in the rotary output member 18 and the rotary work changer 15 being lowered into engagement with the support and locking means of the base 2. In FIG. 2, the cap 45 of the cam 20 is shown in its uppermost position in broken lines.

Reference is now made to the diagram of FIG. 4. It will be noted that the directional valve 23 is connected, as at 72 to a source of hydraulic fluid under pressure, indicated by the word "PUMP". Similarly, the directional valve is connected as at 73 to a hydraulic fluid reservoir, indicated by the word "RESERVOIR".

The directional valve 23 is connected directly to the first port 70 of cylinder 67 of hydraulic actuator 21 via lines 74 and 75. The line 74 contains a check valve 76. The directional valve 23 is also connected via line 77 and line 78 to the second port 71 of hydraulic actuator cylinder 21. The line 77 is provided with a check valve 79. It will be noted from FIG. 2 that the directional valve 23 is mounted upon the cover 40 of housing 27, along with the valve 38 which controls piston 31. Both of the valves 23 and 38 are solenoid actuated valves and can be controlled by the machining center operator or by computer, as is well known is the art. It will further be noted from FIG. 2 that the control valve 24, next to be described, is also mounted in a bore 80 formed in the cover 40 of housing 27. The bore 80 is stepped, and extends from the exterior of the cover 40 to the vertical cover bore 42.

Returning to FIG. 4, the control valve 24 has a valve body 81 which is threadedly engaged (as at 82) within the bore 80. The valve body 81 carries a series of annular seals 83-86 which sealingly engage the bore 80.

The valve body 81 has an axial bore formed therein having a first portion 87a and a second portion 87b of slightly enlarged diameter. A valve spool 88 is located within the bore 87a/87b and is axially shiftable therein. Adjacent its ends, the spool 88 is provided with lands 89 and 90. The spool is further provided with an intermediate land 91. The lands 89, 90 and 91 divide the bore portion 87a into two chambers 92 and 93.

The line 74, ahead of check valve 76, is connected by a line 94 to an annular passage 95 formed by the valve body 81 and the bore 80. The passage 95, in turn, is connected by an orifice 96 to the first chamber 92. In similar fashion, the line 77, ahead of check valve 79, is connected by line 97 to an annular passage 98 formed by the valve body 81 and bore 80. The annular passage 98 is connected to the second chamber by an orifice 99.

Figure 5:
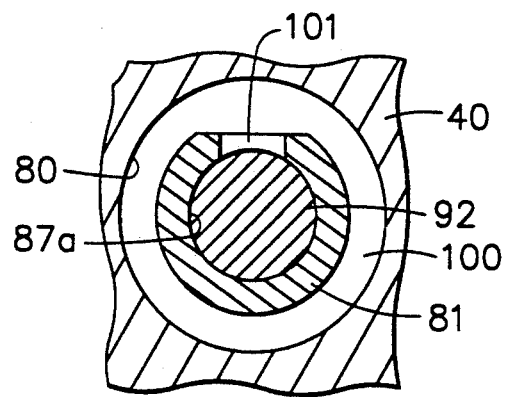
FIG. 5 is a fragmentary cross sectional view taken along section line 5—5 of FIG. 4.

It will be noted from FIG. 4 that the line 74 continues past the line 75 and communicates with an annular passage 100 defined by the valve body 81 and the bore 80. The passage 100 communicates with the first chamber 92 via a first variable flow metering port 101 and a first fixed flow metering port 102 (see FIGS. 5 and 6). In a similar fashion, line 77 extends beyond the line 78 and is connected to an annular passage 103 formed by the valve body 81 and the bore 80. The annular passage 103 communicates with the second chamber 93 via a second variable flow metering port 104 and a second fixed flow metering port 105 (See also FIG. 6).

The endmost land 89 of spool 88 terminates in a surface 89a which abuts the cam surface 20a of cam 20. The cam 20, shown in dotted lines in the upper right-hand portion of FIG. 4, is also fragmentarily shown at the end of spool 88 in the same Figure. The cam 20 and its cam surface 20a determine the axial position of spool 88. This arrangement constitutes a feedback system since the axial position of the spool 88 depends upon the rotative position of cam 20, i.e. the rotative positions of the rotary output member 18 and the rotary work changer 15.

The land 90 of the spool 88 terminates in a portion 90a of lesser diameter within the valve body bore portion 87b. An annular shoulder 90b is formed between the land 90 and its portion 90a. The open end of the bore portion 87b is threaded as at 106 and is threadedly engaged by the threaded skirt of a closure cap 107, surrounded by an O-ring 108. The annular spool shoulder 90b and the inside surface of closure cap 107 comprise seats for the ends of a compression spring 109. The compression spring 109 constantly urges the spool 88 toward the cam 20 and the spool end surface 89a into abutment with the cam surface 20a.

The control valve structure is completed by the provision of an annular spacer member 110 and an annular ring 111 which is threadedly engaged on valve body 81 as at 112. It will be noted that the annular spacer 110 is supported on the valve body 81 and is located between the exterior surface of cover 40 and the annular ring 111. By providing an annular spacer 110 of appropriate width, the axial position of the valve body 81 within the bore 80 can be adjusted so that the cam surface 20a properly determines the various axial positions of the spool 88 within the valve body 81 and the spool 88 functions properly with respect to the indexing system 17.

The indexing system 17 having been described in detail, its mode of operation may now be set forth. For purposes of this description, reference is first made to FIG. 1. Let it be assumed that the work piece (not shown) on pallet 14 has been machined and returned to the rotary work changer 15 by pallet receiver 16. It is therefore desired to interchange the positions of pallets 13 and 14, so that pallet 14 and its work piece can be removed and replaced, while pallet 13 and its work piece will be located in the machining zone 11 for pickup by the pallet receiver 16 and for machining of the work piece (not shown) supported by pallet 13. To accomplish this, it will be assumed that rotary work changer 15 will be rotated 180° in a clockwise direction, as viewed from above in FIG. 1. This means, that as viewed in FIGS. 3 and 4, the rotary output member 15 will be rotated in a counterclockwise direction, since, in FIGS. 3 and 4, the rotary output member 18 is being viewed upwardly from below, as indicated by the section line 3—3 of FIG. 2. To accomplish this motion of the rotary output member 18 and the rotary work changer 15, the rack 22 will be shifted to the right (as viewed in FIG. 4) by the piston 68 and piston rod 69 of hydraulic actuator 21.

As a first step, the rotary output member 18 and the rotary work changer 15 must be shifted upwardly so as to lift and release the rotary work changer from the support member of the machining center base 2. This is accomplished by actuating solenoid valve 38 (see FIG. 2) introducing hydraulic fluid under pressure into annular groove 37 via passages 35 and 36. The hydraulic fluid under pressure will cause the piston 31 to shift upwardly, as described heretofore, lifting the rotary output member 18 and rotary work changer 15.

Once so lifted, rotation of the rotary output member 18 and the rotary work changer 15 can be initiated by shifting directional solenoid valve 23 to the right, to the position shown in FIG. 4. Under these circumstances, the directional solenoid valve 23 connects the output of the hydraulic fluid pump to line 74. The hydraulic fluid passes through check valve 76 and into the first port 70 of cylinder 67 of hydraulic actuator 21, via line 75. A portion of the hydraulic fluid can enter and fill the first chamber 92 via line 94, annular passage 95 and port 96. Initially, the land 91 of spool 88 will have the first variable flow metering port 101 shut off, as shown in FIG. 4. Therefore, hydraulic fluid can exit chamber 92 only via the first fixed flow metering port 102. In the meantime, via line 74, the annular passage 100 will have been filled with hydraulic fluid under pressure. As a consequence of all of this, the primary flow of hydraulic fluid will be via line 74, check valve 76, line 75 and first port 70 into cylinder 67. This flow will cause the piston 68, piston rod 69 and rack 22 to shift from their positions shown in FIG. 4 toward the right, as viewed in FIG. 4, imparting rotation to the rotary output member 18 in a counterclockwise direction as viewed in FIG. 4, or a clockwise direction as viewed from above in FIG. 1. Again referring to FIG. 4, as the piston 68 of hydraulic actuator 21 shifts to the right, hydraulic fluid within the cylinder 67 to the right of piston 68 will exit the piston 67 via port 71 and line 78. Line 78 connects with line 77. Line 77 is connected to reservoir 73 when solenoid valve 23 is shifted to the right in FIG. 4. Hydraulic fluid, however, cannot go directly from line 78 via line 77 to reservoir 73 by virtue of check valve 79. As a consequence, the hydraulic fluid from the second port 71 of cylinder 67 must flow via line 77 into annular passage 103. From the annular passage 103 the hydraulic fluid will pass through the second variable flow metering port 104 and the second fixed flow metering port 105 into chamber 93. The last two mentioned metering ports will determine the rate of flow of the hydraulic fluid from annular passage 103 into chamber 93. From chamber 93, the hydraulic fluid will flow through port 99 and annular passage 98 to line 97 which connects with line 77 downstream of check valve 79, so that the hydraulic fluid is free to pass through directional valve 23 to reservoir 73.

As soon as rotation of the rotary output member 18 and the rotary work changer 15 begins, rotation of cam 20 also begins, resulting in simultaneous longitudinal axial movement of control valve spool 88. The spool 88 starts out from a position wherein its center land 91 is covering the first variable flow metering port 101, as shown in FIG. 4. During the time it takes for the cam 20 to shift the spool 88 to the right as viewed in FIG. 4, to a position wherein its center land 91 begins to close the second variable flow metering port 104, rotation of the rotary output member 18 and rotary work changer 15 will have accelerated and reached a maximum rotational speed.

When the rotary positions of the rotary work changer 15, rotary output member 18 and cam 20 are such that the cam has shifted spool 88 to an axial position wherein spool land 91 will begin to close second variable flow metering port 104, deceleration of rotation of the rotary work changer 15, rotary output member 18 and cam 20 will begin and will continue until land 91 completely closes the second variable flow metering port 104. At this point, hydraulic fluid flow through the second fixed flow metering port 105 will bring the rotary work changer to its desired final position and will maintain it there until, by actuation of solenoid valve 38 (see FIG. 2), piston 31, the rotary output member 18 and the rotary work changer 15 are lowered to a position wherein the rotary work changer 15 is supported by and locked by the support means of the machining center base 2.

To again interchange the pallets supported by the rotary work changer 15, the rotary work changer is rotated in a counterclockwise direction, as viewed from above in FIG. 1. To accomplish this, the rotary work changer 15 is again lifted by actuation of solenoid valve 38 and the directional valve 23 is thereafter shifted to the left, as viewed in FIG. 4. Shifting the direction of valve 23 to the left directly connects the pump line 72 to line 77, check valve 79, line 78, and port 71 of the cylinder 67 of hydraulic actuator 21, to shift the piston 68, piston rod 69 and rack 22 to the left, as viewed in FIG. 4. Under these circumstances, hydraulic fluid within cylinder 67 to the left of piston 68 will exit the piston via first port 70, and line 75 to line 74. Hydraulic fluid cannot go directly to directional solenoid valve 23 and reservoir line 73 by virtue of check valve 76. Therefore, hydraulic fluid from the first port 70 will pass via line 75 and line 74 to the annular passage 100 of control valve 24. From annular passage 100, the hydraulic fluid will flow through the first variable metering port 101 and the first fixed flow metering port 102 into first chamber 92. The hydraulic fluid will exit the first chamber 92 via port 96, annular passage 95, line 94 and line 74 to the directional solenoid valve 23 and reservoir line 73. During this counterclockwise exchange operation, it will be understood that the initial rotational position of cam 20 will cause the initial axial position of spool 88 to be such that the center land 91 has closed the second variable metering port 104. As the counterclockwise interchange operation proceeds, the cam and the compression spring 109 will cause the spool 88 to shift to the left as viewed in FIG. 4, until the center land 91 reaches that position wherein it begins to close the first variable flow metering port 101. At this point, deceleration of the rotation of the rotary work changer will begin and continue until the first variable flow metering port 101 is closed, whereupon hydraulic flow through the first fixed flow metering port 102 will continue rotation of the rotary work changer 15 until it reaches its desired end position and will maintain the rotary work changer 15 in that desired end position until it can be lowered by means of solenoid valve 38 and piston 31, and supported and locked by the support means of the machining center base 2.

From the above explanation, it will be apparent that the control valve 24 operates as a function of the position of the rotary work changer 15, using feedback via cam 20.

While not so limited, the first and second variable flow metering ports 101 and 104 are illustrated as trapezoidal openings, each having its apex (i.e. the shorter of its parallel sides 101a or 104a) and its base (i.e. the longer of its parallel sides 101b and 104b) extending perpendicular to the longitudinal axis of bore 87. The first and second variable flow metering ports 101 and 104 are so oriented that the intermediate land 91, during a particular declaration stroke, closes the appropriate one of the first and second variable flow metering ports 101 and 104 by passing thereacross from apex 101a or 104a to base 101b or 104b, respectively.

When the rotary work holder 15 is rotated in a clockwise direction as viewed from above in FIG. 1, the amount of hydraulic fluid exhausted from the second port 71 of hydraulic actuator 21 is less than the amount of hydraulic fluid exhausted from the first port 70 of hydraulic fluid actuator 21 when the rotary work changer 15 is rotated in a counterclockwise direction, as viewed in FIG. 1. This is true by virtue of the presence of piston rod 69. Further more, as viewed in FIG. 4, the area of the left face of the piston is greater than the area of the right face of the piston. The right face of the piston is annular, rather than circular, by virtue of the presence of piston rod 69. These factors must be taken into consideration in designing the size of the first and second fixed flow metering ports 102 and 105, and in designing the size and shape of the first and second variable flow metering ports 101 and 104. It will be understood by one skilled in the art that the first and second variable flow metering ports 101 and 104 and the first and second fixed flow metering ports 102 and 105 are not drawn in scale in FIGS. 4, 5 and 6. However, as is suggested in FIGS. 4 and 6, the first variable flow metering port 101 is somewhat larger than the second variable flow metering port 104, and the first fixed flow metering port 102 is also somewhat larger than the second fixed flow metering port 105. The first and second variable flow metering ports 101 and 104 may be formed in any appropriate manner such as by an electro-jetting operation.

It will be remembered that it is desirable to make a pallet interchange move as rapidly as possible. As is well known to one skilled in the art, the weight of a work piece may range from hundreds of pounds to two or three thousand pounds or more, depending upon the design of the machining center 1. It is therefore further desirable to have the indexing system 17 display uniform performance under various load conditions. It is also desirable to have the same rotation rate, even though the volume of hydraulic fluid displaced through the first and second ports 70 and 71 of the hydraulic actuator 21 are different. The cam surface 20a is a simple cylindrical surface. Therefore, the axial movement of the control valve spool 88 will be equal and opposite during clockwise and counterclockwise interchange operations. It has been found that whether the rotary work changer 15 is empty or carrying a maximum load has little affect on performance, there being about a ¼ second difference in the length of time to perform an interchange operation loaded and unloaded. The indexing system of the present invention also is relatively insensitive to temperature and thus to the viscosity of the hydraulic fluid. As a consequence of all this, it will be understood that the size of the first and second variable flow metering ports and the first and second fixed flow metering ports, together with the shape of the first and second variable flow metering ports will play a part in determining the desired motion control for the indexing system 17.

The velocity of the rotary work changer 15 must be controlled at the correct rate to produce the desired motion during deceleration. This, in turn, depends upon the motion of the spool 88 (determined by the shape of the cam surface 20a) and the shape of the variable flow metering port (101 or 104) being closed. In the embodiment described, an eccentric cylindrical cam 20 was selected for ease of manufacture. The eccentricity of cam 20 imparts a sinusoidal motion to the spool 88 (i.e. a harmonic motion). Thus having been decided, the shape of the variable flow metering port (101 or 104) can be determined to be trapezoid-like by appropriate and known fluid mechanics calculations. In the exemplary embodiment illustrated, a number of choices were made for manufacturing convenience. For example, the cam surface was chosen to be cylindrical. The spool 88 of the control valve 24 was provided with square shouldered lands 89, 90 and 91. The trapezoidal variable flow metering ports 101 and 104 were configured as pure trapezoids.

An indexing system of the present invention was applied to a machining center of the general type illustrated in FIG. 1. The rotary work changer 15 carried two pallet and work piece assemblies weighing 2,200 pounds each. The cylinder 67 of the hydraulic actuator 21 had a bore of 2.5 inches with a rating of 3,000 p.s.i. The cylinder was operated at 800 p.s.i. One-half inch tubing was used to and from the reservoir. The cam had an eccentricity of 6 mm.

Figure 6:
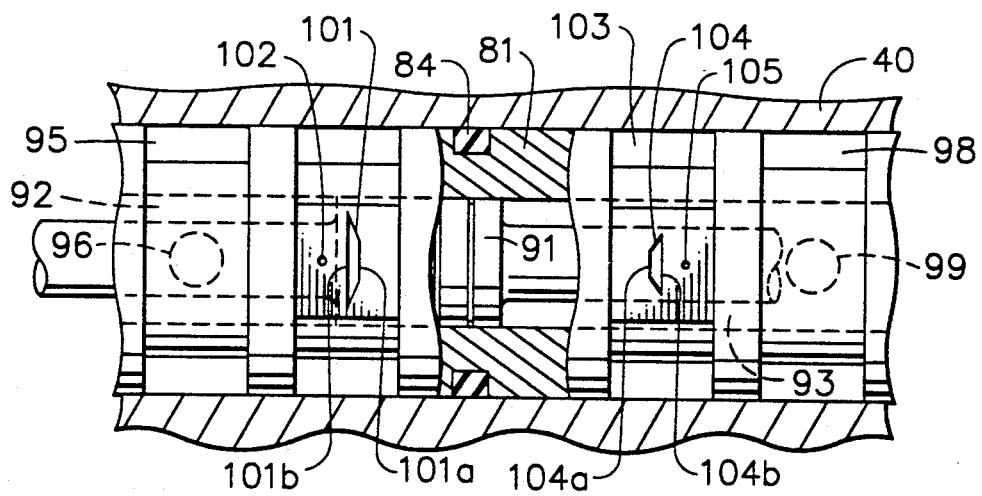
FIG. 6 is a fragmentary, cross sectional view taken along section line 6—6 of FIG. 4.
Figure 7:
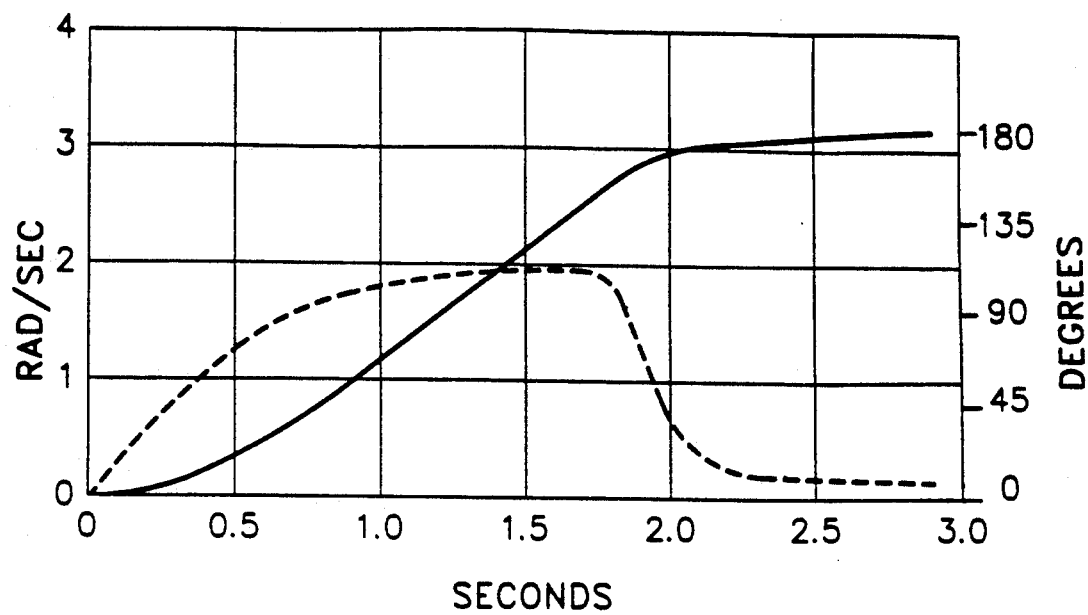
FIGS. 7 and 8 are graphs illustrating the angular velocity and position of a rotary work changer carrying a maximum load and rotating in clockwise and counterclockwise directions respectively.

The rotary work changer 15 was rotated in a clockwise direction with the result that hydraulic fluid from the cylinder 67 of hydraulic actuator 21 passed through the second variable flow metering port 104 and the second fixed flow metering port 105. Turning to FIG. 6, the side 104a of the second variable flow metering port 104 had a dimension within the range of 0.100 to 0.104 inch. The side 104b of the second variable flow metering port 104 had a dimension within the range 0.248 to 0.250 inch. The distance the port sides 104a and 104b was within the range of 0.050 and 0.052 inch. The corners of the second variable flow metering port 104, at the ends of side 104b, had a radius within the range of 0.005 to 0.010 inch. The second fixed metering port 105 had a diameter of 0.28 inch. In the graph of FIG. 7, the solid line indicates the position and the broken line indicates the angular velocity of the rotary work changer 15 during the clockwise interchange operation.

Figure 8:
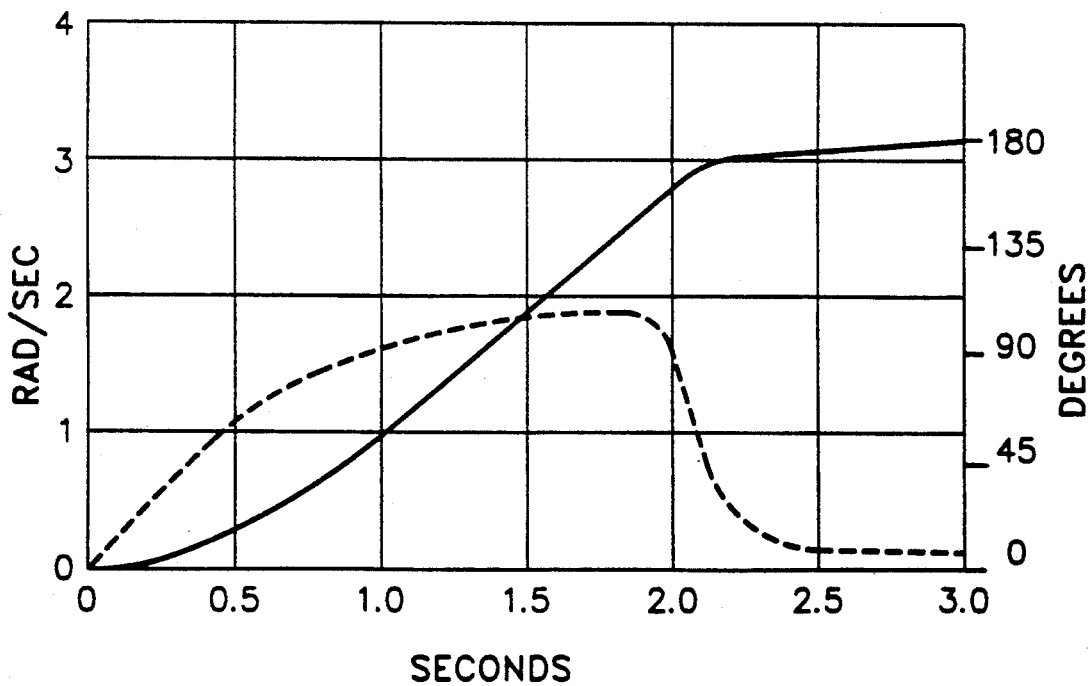

FIG. 8 is a graph illustrating both the position (in solid line) and the angular velocity (in broken line) of the same rotary work changer 15 in the same machining center 1 with the same indexing system 17, performing a counterclockwise interchange operation. In this instance, all of the parameters were the same with the exception that fluid exiting from the first port 70 of cylinder 67 of hydraulic actuator 21 passed through the first variable flow metering port 101 and the first fixed flow metering port 102. As noted above, both the first variable flow metering port 101 and the first fixed flowing metering port 102 are larger than the second variable flow metering port 104 and the second fixed flow metering port 105, respectively. In this instance, the first fixed flow metering port had a diameter of 0.034 inch. The side 101a of the first variable flow metering port 101 had a dimension falling with the range of 0.165 to 0.167 inch. The side 101b of the first variable metering port 101 had a dimension falling within the range of 0.400 to 0.402 inch. The distance between the sides 101a and 101b fell within the range of 0.050 to 0.052 inch. Finally, the corners of the first variable flow metering port 101 at the ends side 101b had a radius within the range of 0.005 to 0.010 inch. Despite the fact that the volume of hydraulic fluid displaced through port 71 during clockwise rotation was less than the amount of hydraulic fluid displaced through port 70 during counterclockwise rotation, there was very little difference between the performance of the loaded rotary work changer 15 when the clockwise and counterclockwise interchange operations were compared.

Figure 9:
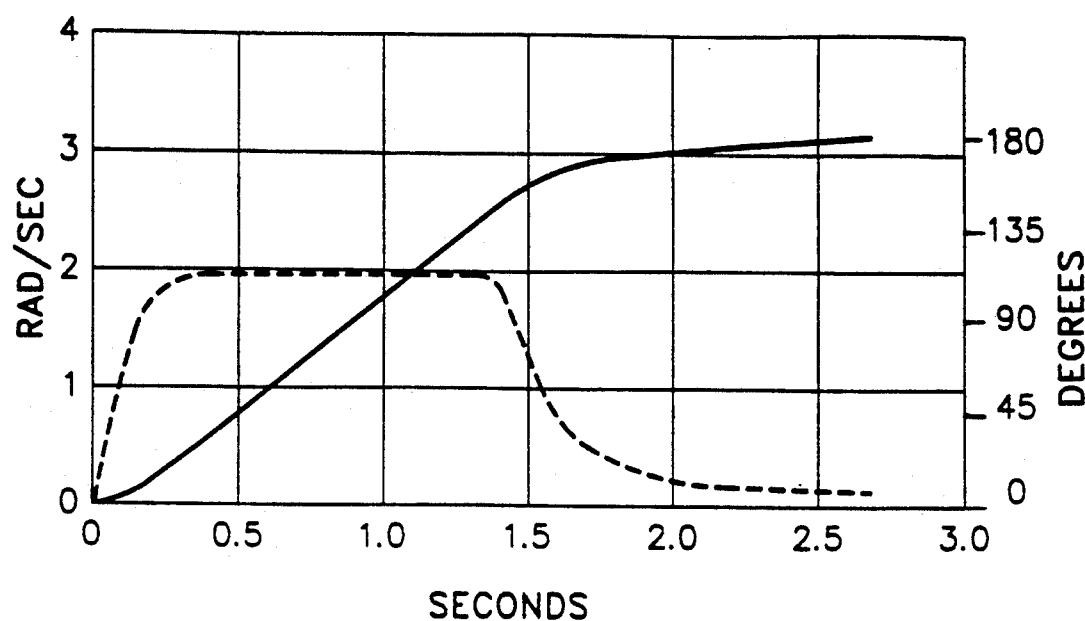
FIGS. 9 and 10 are graphs illustrating the angular velocity and position of a rotary work changer carrying no load and rotating in clockwise and counterclockwise directions respectively.
Figure 10:
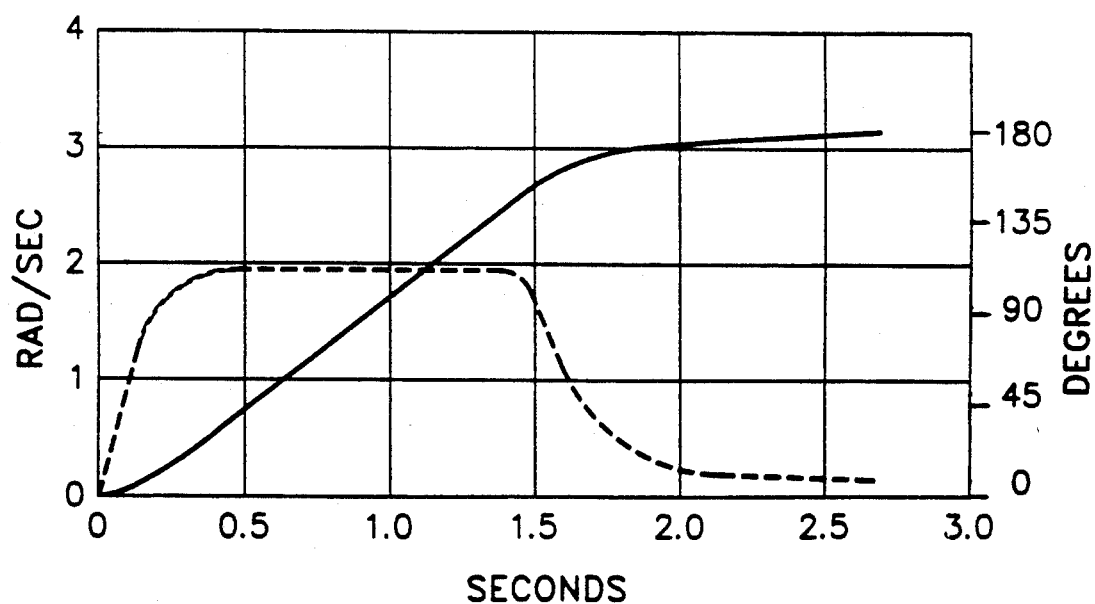

FIGS. 9 and 10 are graphs indicating position (in solid line) and velocity (in dashed line) for the very same equipment under the very same conditions with the exception that rotary work changer 15 carried two pallets only. FIG. 9 relates to a clockwise interchange operation, while FIG. 10 illustrates a counterclockwise interchange operation. Again it is demonstrated that there is very little difference between the two. Furthermore, a comparison of FIGS. 7 and 8 with FIGS. 9 and 10, respectively, illustrates that there is remarkably little difference between a heavily loaded rotary work changer 15 and an unloaded rotary work changer 15.

Again it is pointed out that the indexing system 17 of the present invention constitutes a separate package which can be separately tested prior to installation on the machining center 1.

Modifications may be made in the invention without departing from the spirit of it.

What is claimed:

1. An indexing system for a rotary member capable of clockwise and counterclockwise rotational interchange moves between two predetermined diametrically opposed rotative positions, said indexing system comprising a rotary output member, hydraulic actuator means for rotating said rotary output member in clockwise and counterclockwise directions and having first and second ports, said rotary output member being operatively connected to said rotary member such that rotation imparted to said rotary output member is similarly imparted to said rotary member, a cam having a cam surface being located on said rotary output member, a control valve having a body with cylindrical bore and a spool axially shiftable therein, said spool having first and second ends, means biasing said spool first end into constant contact with said cam surface to shift said spool axially within said control valve bore as said rotary output member and said cam surface rotate, said spool having a land adjacent each of its first and second ends and an intermediate land therebetween, said end lands and said intermediate land dividing said bore into first and second chambers, said first chamber having a first variable flow metering port and a first fixed flow metering port, said second chamber having a second variable flow metering port and a second fixed flow metering port, means connecting said first hydraulic actuator means port to said first fixed and variable flow metering ports of said first control valve chamber and said second hydraulic actuator means port to said second fixed and variable flow metering ports of said second control valve chamber, a hydraulic fluid pressure line and a hydraulic fluid return line, a directional valve means for connecting said hydraulic fluid pressure line directly to either one of said first and second ports of said hydraulic actuator means depending upon the desired direction of rotation of said rotary member and for connecting said hydraulic fluid return line to the other of said first and second ports of said actuator means through said one of said first and second chambers of said control valve to which said last mentioned port of said hydraulic actuator is connected, to rotate and to determine the direction of rotation of said rotary output member and said rotary member, whereby as said rotary member rotates through an interchange move it will accelerate to a maximum speed and then the cam surface will cause the control valve stem to shift, closing the variable flow metering port of said last mentioned chamber, to decelerate the rotation of the rotary member until it is brought to its final desired position and maintained there by flow only through said fixed metering port of said last mentioned chamber.

2. The indexing system claimed in claim 1 wherein said rotary member comprises a rotary work changer means of a machining center for supporting and interchanging work-holder pallets, said predetermined diametrically opposed rotative positions comprising a load/unload zone position and a machining zone position of said machining center.

3. The indexing system claimed in claim 1 including a pinion gear in association with said rotary output member and rotatable therewith, said hydraulic actuator means comprising a hydraulic cylinder having said first and second ports, a piston and piston rod within said cylinder, said piston rod having a portion extending exteriorly of said cylinder, a rack connected to said piston rod portion and having teeth meshed with said pinion gear, whereby shifting of said piston within said cylinder in one axial direction will cause similar longitudinal shifting of said piston rod and said rack, resulting in clockwise rotation of said pinion gear, said rotary output member and said rotary member, and shifting of said piston within said cylinder in the opposite axial direction will cause similar shifting of said piston rod and said rack, resulting in counterclockwise rotation of said pinion gear, said rotary output member and said rotary member.

4. The indexing system claimed in claim 1 wherein said cam comprises an integral one-piece part of said rotary output member.

5. The indexing system claimed in claim 1 wherein said control valve spool biasing means comprises a compression spring abutting said spool second end.

6. The indexing system claimed in claim 1 wherein said cam and said rotary output member have longitudinal axes which are parallel and offset with respect to each other, said cam surface being cylindrical, said first and second fixed flow metering orifices each being circular and said first and second variable flow metering ports each being trapezoidal in configuration.

7. The indexing system claimed in claim 3 including a housing having a first bore receiving said rotary output member and said pinion gear and cam associated therewith, said directional valve being mounted on said housing, said control valve body being mounted in a second bore in said housing perpendicular to said first bore and communicating therewith, said first end of said control valve spool contacting said cam surface, said control valve body being axially adjustable in said second housing bore, said cylinder of said hydraulic actuator means being affixed to said housing, said housing having a third bore communicating with said first bore, said rack shiftably mounted in said third bore in engagement with said pinion gear.

8. The indexing means claimed in claim 3 wherein said pinion gear comprises an integral one-piece part of said rotary output member.

9. The indexing system claimed in claim 6 wherein each of said first and second variable flow metering ports of trapezoidal configuration has its short and long parallel sides extending perpendicularly to the axis of said control valve body, each of said first and second variable flow metering ports being so oriented that it is closable by said intermediate land of said control valve spool from its short side toward its long side.

10. The indexing means claimed in claim 7 wherein said pinion gear and said cam comprise integral one-piece parts of said rotary output member.

11. The indexing system claimed in claim 7 wherein said rotary member comprises a rotary work changer means of a machining center for supporting and interchanging work-holder pallets, said predetermined diametrically opposed rotative positions comprising a load/unload zone position and a machining zone position of said machining center.

12. The indexing system claimed in claim 7 wherein said cam and said rotary output member have longitudinal axes which are parallel and offset with respect to each other, said cam surface being cylindrical, said first and second fixed flow metering orifices each being circular and said first and second variable flow metering ports each being trapezoidal in configuration, each of said first and second variable flow metering ports of trapezoidal configuration having its short and long parallel sides extending perpedicularly to the axis of said control valve body, each of said first and second variable flow metering ports being so oriented that it is closable by said intermediate land of said control valve spool from its short side toward its long side.

13. The indexing system claimed in claim 11 including means to support said housing above said rotary work changer, a base for said machining center, means on said base for normally supporting and locking said rotary work changer in either one of said predetermined positions, a hollow piston being sealingly mounted within said housing first bore and shiftable vertically therein under the influence of hydraulic fluid under pressure, a lift valve controlling said hydraulic fluid for said hollow piston causing said hollow piston to shift between normal and raised positions, said rotary member being rotatably mounted within said hollow piston, whereby when it is desired to rotate said rotary output member and said attached rotary work changer, said lift valve shifts said hollow piston to its raised position, lifting said rotary output member and said rotary work changer, and freeing said rotary work changer from said supporting and locking base means.

14. The indexing system claimed in claim 13 wherein said cam and said rotary output member have longitudinal axes which are parallel and offset with respect to each other, said cam surface being cylindrical, said first and second fixed flow metering orifices each being circular and said first and second variable flow metering ports each being trapezoidal in configuration.

15. The indexing system claimed in claim 14 wherein each of said first and second variable flow metering ports of trapezoidal configuration has its short and long parallel sides extending perpedicularly to the axis of said control valve body, each of said first and second variable flow metering ports being so oriented that it is closable by said intermediate land of said control valve spool from its short side toward its long side.

* * * * *

UNITED STATES PATENT AND TRADEMARK OFFICE
CERTIFICATE OF CORRECTION

PATENT NO. : 5,261,147
DATED : March 16, 1993
INVENTOR(S) : David B. Wood, III

It is certified that error appears in the above-indentified patent and that said Letters Patent is hereby corrected as shown below:

Column 12, line 7, "0.28" should read —0.028—.

Signed and Sealed this

Thirty-first Day of May, 1994

Attest:

BRUCE LEHMAN

*Attesting Officer*    Commissioner of Patents and Trademarks